United States Patent
Gruskin et al.

(10) Patent No.: US 8,145,647 B2
(45) Date of Patent: Mar. 27, 2012

(54) SYSTEM, METHOD AND COMPUTER PROGRAM PRODUCT FOR ELECTRONICALLY RESPONDING TO REQUESTS FOR PRODUCT RELATED DATA

(75) Inventors: Michael A. Gruskin, West Bloomfield, MI (US); Barbara L. Ciaramitaro, Grosse Pointe Woods, MI (US); Edward C. Wolfe, Bloomfield Hills, MI (US)

(73) Assignee: Xerox Corporation, Norwalk, CT (US)

( * ) Notice: Subject to any disclaimer, the term of this patent is extended or adjusted under 35 U.S.C. 154(b) by 845 days.

(21) Appl. No.: 12/057,861

(22) Filed: Mar. 28, 2008

(65) Prior Publication Data
US 2008/0250013 A1    Oct. 9, 2008

Related U.S. Application Data

(60) Provisional application No. 60/909,214, filed on Mar. 30, 2007.

(51) Int. Cl.
G06F 17/30 (2006.01)
G06F 7/00 (2006.01)

(52) U.S. Cl. .................... 707/749; 707/752
(58) Field of Classification Search .......... 707/769, 707/802
See application file for complete search history.

(56) References Cited

U.S. PATENT DOCUMENTS

| | | | |
|---|---|---|---|
| 7,058,661 B2 | 6/2006 | Ciaramitaro et al. | |
| 7,065,515 B2 | 6/2006 | Ciaramitaro et al. | |
| 7,130,858 B2 | 10/2006 | Ciaramitaro et al. | |
| 2003/0204522 A1* | 10/2003 | Gallagher et al. | 707/102 |
| 2003/0237051 A1* | 12/2003 | LaMarca et al. | 715/513 |
| 2005/0004950 A1 | 1/2005 | Ciaramitaro et al. | |
| 2005/0004951 A1 | 1/2005 | Ciaramitaro et al. | |
| 2005/0010600 A1* | 1/2005 | Ciaramitaro et al. | 707/104.1 |
| 2005/0010601 A1 | 1/2005 | Ciaramitaro et al. | |
| 2007/0192359 A1* | 8/2007 | Steeb et al. | 707/102 |
| 2007/0255712 A1* | 11/2007 | Mahoney et al. | 707/9 |

* cited by examiner

*Primary Examiner* — Fred I Ehichioya
*Assistant Examiner* — Sabana Rahman
(74) *Attorney, Agent, or Firm* — Cantor Colburn LLP

(57) ABSTRACT

A method for electronically responding to requests for product related data, the method includes: collecting product related data from feeder systems; organizing the collected product related data into digital libraries within a document management system; receiving a discovery request from legal counsel to identify related documents; searching the product related data for documents; tagging documents identified in the search and placing copies of the documents in a holding queue; and importing the documents in the holding queue to a litigation support system.

23 Claims, 4 Drawing Sheets

Menu Items

- File
    - Document Foldering
    - Document Search
    - Request Management
    - Request Search
    - Exit
- Options
    - Advanced Search
    - Contact Management
    - Preferences
        - Grid
        - Database
    - Request Status
- Reports
- Help
    - GPDIS Help
    - About GPDIS

*FIG. 2*

DFM Menu Bar
- Delete Folder
- Create Folder
- Modify Folder
- Filter
- Associate Folder DFM Folder Tree
- Reports
  - Document Detail (DFM)
- Associate Folder
- Create Folder
- Delete Folder
- Modify Folder
- Filter
- Expand All
- Collapse All DFM Folder Tree
- Reports
  - Document Detail (Individual Document)
- Filter Grid
- Sort Grid
- Associate Document
- Composite Documents
- Copy to DFM Folder
- Document History
- Document Image
- Document Properties
- Full Text
- Image Copy
- Print Document Image
- Remove Documents
- Print Grid
- Select All

*FIG. 3*

SYSTEM, METHOD AND COMPUTER PROGRAM PRODUCT FOR ELECTRONICALLY RESPONDING TO REQUESTS FOR PRODUCT RELATED DATA

CROSS-REFERENCE TO RELATED APPLICATIONS

This application claims the benefit of U.S. provisional patent application Ser. No. 60/909,214, filed Mar. 30, 2007, the disclosure of which is incorporated herein by reference in its entirety.

BACKGROUND

Exemplary embodiments relate generally to managing product related data, and more particularly, to systems, methods and computer program products for electronically managing requests for product related data.

Businesses often have to respond to requests for information from others in the business, including, but not limited to, legal staff, government regulations staff, and product engineering staff. Responding to a request may involve searching through large volumes of materials, including both physical papers and electronic documents. For example, legal matters often involve large volumes of information that must be organized and categorized in response to particular inquires or issues, such as litigation pleadings, business transactions, government relations, and other legal matters. The information is typically managed by a centralized organization, such as a legal department or group therein having document coordinators. Managing this legal information often requires organizing both textual information as well as documents.

One type of documentation that must be managed is product related data. Product related data is often stored in several locations and systems. This can make it difficult to effectively and consistently search large volumes of product related data in order to provide relevant material in support of legal discovery (as well as for other purposes).

Collecting product related data is often a manual process that includes the use of e-mails, telephone calls and spreadsheets created by individuals. At the beginning of product related litigation, a typical scenario involves a legal assistant contacting the engineering group and requesting documentation related to the matter at hand. The engineering group then assigns the request to a single employee who may manually search several dozen product development document repositories to identify relevant material. This material is then gathered together and provided to the requesting legal assistant, some time following their initial request. Future requests of a similar nature are handled in the same manner, often with little or no consideration given to the prior search and document retrieval. This is due to their being no common process and/or system for tracking either requests for product related data or the documents provided in response to them.

It would be desirable to be able to manage the collection and organization of product related data for responding to requests for information. Further, in response to a request for documents (e.g., for a litigation matter) it would be desirable to be able to automate the document retrieval process and to be able to replicate prior searches and document retrievals performed in the past. This would lead to more thorough searches and more consistent information being provided to the requesters.

SUMMARY

An exemplary embodiment of the invention is a method for electronically responding to requests for product related data, the method comprising: collecting product related data from feeder systems; organizing the collected product related data into digital libraries within a document management system; receiving a discovery request from legal counsel to identify related documents; searching the product related data for documents; tagging documents identified in the search and placing copies of the documents in a holding queue; and importing the documents in the holding queue to a litigation support system.

Other systems, methods, and/or computer program products according to embodiments will be apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF THE DRAWINGS

Referring now to the drawings wherein like elements are numbered alike in the several FIGURES:

FIG. 2 depicts an exemplary main menu screen that may be implemented by exemplary embodiments for electronically managing product related data;

FIG. 3 depicts an exemplary data foldering module menu screen that may be implemented by exemplary embodiments for electronically managing product related data.

DETAILED DESCRIPTION

Exemplary embodiments provide a software tool that assists a business in efficiently and electronically storing its legacy materials. The tool also facilitates responding to requests for information from others in the business including, but not limited to, legal staff, government regulations, and product engineering. Exemplary embodiments allow business users to track responses to requests for information and to reuse the stored attributes to respond to similar requests. Exemplary embodiments also provide for integration to other systems by allowing electronic records associated with a request to be electronically exported and put in a queue for loading into another system.

Figure 1:
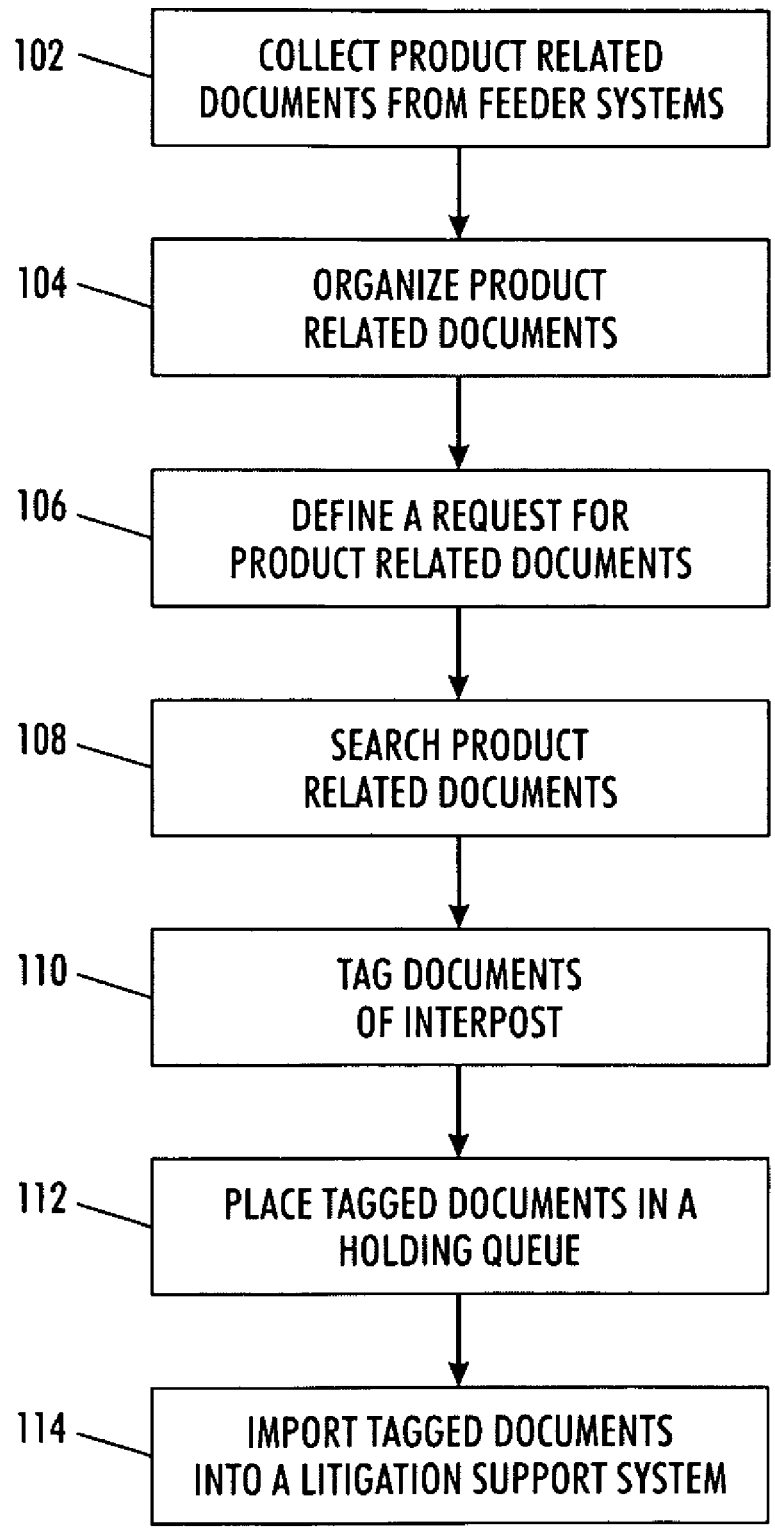
FIG. 1 depicts an exemplary process flow that may be implemented by exemplary embodiments for electronically managing product related data.

Exemplary embodiments relate to a business process and related supporting software used to manage the collection and organization of product related data for future use in legal discovery. An exemplary process is depicted in FIG. 1. At block 102, product related documentation, or data, is collected from feeder systems, either in paper or electronic format. At block 104, the collected documentation is organized into standard digital libraries within a document management system. In an exemplary embodiment, the system contains functionality to capture discovery requests from legal counsel in a standard format to simplify identifying related documents. Once a request is defined (block 106), users are able to search for documents (block 108) using a typical search interface or by browsing folder-based collections of related documents that have been organized by product and category. At block 110, documents identified as being of interest are tagged by the user and are then automatically placed in a holding queue (block 112) for import to another system (e.g., a litigation support system). At block 114, the tagged documents in the holding queue are imported in the litigation support system. This request tracking and automated collection and export/import of related documents is implemented by a software tool referred to herein as the Global Product Development Information System or "GPDIS".

The GPDIS disclosed herein may be utilized to ensure that the product related document repository is thoroughly searched during discovery and that a well documented chain of custody is established for these documents. In addition, exemplary embodiments of the GPDIS provide a system that can electronically track product related documents and consistently respond to requests from the legal community and others.

The GPDIS described herein provides storage, searching and retrieval, and organization of the product related documents, records and their images. The ability to track requests and associate the documents to the requests is also provided. In addition, GPDIS users are able to fulfill requests by exporting them to a system such as a litigation support application (LSA) (described herein below), sending them to a processing center for mass printing and/or by copying document images to a hard drive or disk.

Potential users of the GPDIS include legal staff (e.g., discovery coordinators), and product development staff such as discovery contacts and/or engineers. For example, the discovery contacts may perform tasks such as: entering requests, searching for documents, foldering documents, running reports, exporting documents, mass printing documents, and copying document images to hard drives and disks. The engineers may perform tasks such as searching for documents, foldering documents, and running reports. The discovery coordinators on the legal staff may perform tasks such as importing documents from the GPDIS instance after their requests have been fulfilled by a GPDIS user. Some users may have more limited access to perform tasks such as searching and foldering documents in a GPDIS database to satisfy product investigations, and running reports. In an exemplary embodiment, legal staff is not given access to the GPDIS and they give their requests to product development staff who enter the requests into the GPDIS and exports the results to a specified legal system.

The GPDIS provides the product development (PD) users with a comprehensive set of functionality to track and respond to requests from various customers including, for example, the legal staff. PD is an example of one type of data/documents that may be managed with the GPDIS, other types of data/documents may also be managed (e.g., marketing, financial, engineering, etc.) Functions include the ability to store PD documents, folder PD documents, search PD documents, track requests, associate documents to a request question, export GPDIS documents for imported into another system, print GPDIS documents, copy images to a hard drive or disk, search requests, and reporting. When the documents are being exported for use in an LSA system, the LSA users may be provided with the ability to import GPDIS documents into the LSA system.

Storing PD Documents. When the PD documents are stored, they will be entered into a new GPDIS instance (e.g., data repository or GPDIS database) and will be similar to the documents loaded into a LSA instance. They will be composed of one or more pages and have document level attributes that will be coded with the documents.

Foldering GPDIS Documents. The GPDIS application has the ability to create folders and folder documents in the same manner that the LSA provides the ability to create folders and perform foldering. A third folder group will be required to support foldering documents by source. The three groups will be source, collection, and user folders. Functionality available in the document foldering module (DFM) will remain similar to the foldering functions provided by the LSA. An exemplary list of folder level attributes and functionality is included herein below.

Searching GPDIS Documents. The ability to locate documents in the GPDIS instance is similar to the search functionality available in the LSA. Using the existing "document search" functionality from the main module, users will be able to search for documents based on a list of fields. The search will return a grid of matched documents from the selected search fields. Exemplary available fields to search on are described herein below. As used herein, a grid refers to a table that lists various attributes in response to a search, such as title, date of the document, and other objective data. A document grid that is displayed, for example, may have one row for each document, the row being made up of columns that contain the document identifier, the document type, the date the document was last updated, and other objective data about the document.

Tracking Requests. When a request is received, the user will enter it into the GPDIS via a request management module (RMM) that groups similar requests together. Information captured includes request group, individual request, and question. The top level denotes the request group (case or subject). The second level captures the request details. The third level denotes the actual question(s) to be answered for each request. Standard naming conventions for these different levels will need to be implemented by the business using the GPDIS. Specific attributes captured on each level are described herein below.

Associating Documents to a Request Question. After documents have been located for response to a request question, whether by performing a search of the repository or from a collection of documents that have been foldered, the documents must be linked to a question to create a relationship between the question or request number and documents. The user will identify the documents by identifying the request and appropriate target question during the association process. The questions refer to a description of the information that the requestor is seeking to locate and identify characteristics of the potentially responsive documents or information. Specific attributes available to identify the request and question, along with the process are described herein below.

Exporting GPDIS Documents. Once documents have been associated to the appropriate question, the GPDIS user finishes processing legal requests by exporting the documents to the LSA application. GPDIS users create the export by selecting an export feature from the desired question. Once exported, a record of the export and documents contained in the export is maintained and grouped with all exports for that question. In exemplary embodiments, the only destination for these exports will be the LSA application. In other embodiments, the documents are exported to other systems/people, including, but not limited to, a product engineering staff member or to respond to a question about compliance with a government regulation. After an export, an exemplary structure of the export record includes a request group, one or more requests, each having one or more questions. Each question corresponds to an export which contains a record of all documents exported in response the question. Specific attributes assigned during the export process are described herein below.

Printing GPDIS Documents. The GPDIS users are provided with the ability to perform large, offline printing to a facility such as a processing center. Once documents have been associated to the appropriate question, the GPDIS users will have the ability to finish processing the request by sending a print request to a processing center. Users prepare the print request by selecting a print feature from the desired question and capturing output specific information and location of where the output is to be delivered. The processing center will then process the request using a high speed print system. Once a job has been sent to the printing center, a record of the print, documents contained, and location shipped is maintained and grouped with all prints for that question. In general, it is more efficient for all mass prints to be sent to and processed by the processing center. After a print, the structure of the print record includes a request group having one or more requests, each request having one or more questions and each question having a print record and a list of the documents printed. Documents may be printed from any document grid or from within the image viewer. The image viewer refers to the manner in which a user can see a visual representation of the document with which he is working, as well as have the ability to perform certain system functions on that document. Specific output information and process is detailed herein below.

Copying Images to a Hard Drive or Disk. The ability to copy images to a hard drive or disk is also available for the GPDIS users. Once documents have been associated to the appropriate question, the GPDIS users have the ability to finish processing the request by copying the selected document images to a hard drive or disk. Users select a save feature from the desired question and select the location to save the files to. Once a request has been processed as an image copy, a record of the save and documents contained is maintained and grouped with all other image copies for that question. After the save, the record structure includes a request group having one or more questions with each question having an image copy record and a list of the documents saved. Users are also able to copy images of documents in any search results grid or from the image viewer. If a user elects to use this image copy feature, there will be no record of the copy. Only copies performed from the context of the request group for a specified request and question will be recorded. Process specifics are detailed herein below.

Searching Requests. GPDIS users also have the ability to search requests that have already been entered into GPDIS. By searching these requests, they will be able to reference previous work and easily determine if similar questions have been processed. The search will return requests, but allow the user to view the questions and documents associated to those questions for a given request. Process specifics are detailed herein below.

Importing GPDIS Documents into LSA. LSA users will have the ability to import documents exported from the GPDIS into an identified folder. The import creates a document record and associated images with that document, and maintain a way to identify documents included in each import. LSA users launch the import from a selected folder, locate a queued export and import the documents into LSA. Process specifics are detailed herein below.

Reporting—Document Detail Report. A report detailing document specific attributes for an identified set of documents from a folder or individual documents is provided. When the documents identified are the result of a document search on the repository, the query to produce that set is displayed on the report. When run from a folder, the documents are grouped with respect to the folder in which they are contained.

Reporting—Question Report. A report detailing documents associated to specific questions is also provided. The scope of documents included in the report is flexible depending on the level (group, request, or question) selected. Documents are displayed with respect to the question or question and response that the document(s) were included in for the selected level.

The following sections provide a more detailed description of the GPDIS functions. When the application is launched, the application connects to the GPDIS instance it should connect to (i.e., the one specified) and displays the GPDIS login screen. The login screen logs the users into the GPDIS. The "database preferences" screen displays after the user has logged into the application. This screen will allow the user to select the database(s) they wish to log into from a list they have been granted access to. The main module will be the first screen once the user has logged in and selected the appropriate database(s). This screen (or form) is the entry point for all modules of the GPDIS along with user options. An example main module screen is depicted in FIG. 2.

Document Foldering Module (DFM). When the document foldering option is selected from the user interface screen depicted in FIG. 2, the document foldering module in the GPDIS is open with a document foldering main screen depicting three folder groups. The folder groups include: source, collection, and user.

Source (DFM). Documents are foldered into source folders at the time of load into the GPDIS repository. They are organized using a categorization method defined by the PD user base. This categorization method may vary based on customer installation requirements. Control of these folders is limited to users identified by PD. Only these users will have the ability to move, delete, create, add documents to, delete documents from, or modify the source folders. If a user who does not have access to perform these functions on a source folder attempts to perform one of the functions, the application will notify them they do not have access and prevent the action.

Collection (DFM). Documents are foldered into collection folders by users of the GPDIS using a categorization method defined by the GPDIS user base. In an exemplary embodiment, the current folder security provided by LSA will be implemented for collection folders. In general, folder security that permits the system administrator to define what access and functional rights a user has in the application is provided for the collection folders.

User (DFM). Documents are foldered into user folders by users of the GPDIS using a categorization method defined by the GPDIS user base of a particular installation. The current folder security provided by LSA will be implemented for user folders. In general, folder security that permits the system administrator to define what access and functional rights a user has in the application is provided for the user folders. When displaying folders in the DFM Tree, folders with a folder status of "complete" will be displayed in black font. When folders with a folder status of "not complete" are displayed, they will be in red italic font. As used herein, the DFM tree refers to a list that includes the folders and any subfolders. An example of the functions available from the DFM main screen is depicted in FIG. 3.

Delete Folder (DFM). The user may select the option on the screen depicted in FIG. 3 to delete a folder on FIG. 3. Deletion is allowed when the user performing the deletion is the owner and the folder has not been associated to a question in the Request Management Module.

Create Folder (DFM). The create folder screen is displayed when the create folder option is selected on the user interface screen depicted in FIG. 3. When creating folders, one or more of the following attributes are captured: Folder Name; Folder Type; Folder Owner; Database; Folder Status; and Folder Comments. Folder Name is the concatenation of the character prefix of the database the folder belongs to and the folder name. The Folder Name is unique across the folder level with the same parent. Folder Type is determined by the top level parent folder (source, collection, or user) and cannot be modified. The Folder Owner is the GPDIS user who is the owner of the folder. When created, the owner will default to the creator but can be modified. If created as a folder with depth greater than two, the owner will be the same as its parent and cannot be modified. The Database is the database that the creator selected for the folder. This is chosen from the GPDIS databases within the GPDIS repository that the user has access to. If created as a folder with depth greater than two, the database will be the same as its parent and cannot be modified. The Folder Status is the status of the folder (Complete or Not Complete). On creation, the status is Not Complete and cannot be modified. The Folder Comments include comments regarding the folder that are entered by the creator.

Modify Folder (DFM). A user may select the modify folder option from the DFM main screen depicted in FIG. 3. Selecting this option results in a Modify Folder screen being opened. Modification is allowed when the user launching the modification is the owner of the folder. In exemplary embodiments, the following attributes can be modified: Folder Name; Folder Owner; Database; Folder Status; and Folder Comments. Modification of Folder Name, Comments, and Status can occur at any time by the owner of the folder. Ownership of a folder tree can be modified by the owner on the level 1 folder at any time. As used herein, the term level 1 folder refers to the initial or "parent" folder created by a user. The user can later create "child" or subsidiary folders as needed. The database of a folder tree can be modified by the owner on the level 1 folder if the selected folder and all children are in the appropriate folder state (e.g., a folder has not been associated to a question in the Request Management Module).

Filter (DFM). A user may select the filter option on the exemplary user interface depicted in FIG. 3. This allows the user to enter criteria for filtering the DFM Tree. The user is able to filter the folder tree on the following attributes: Folder Creation Date, Folder Name; Folder Type; Folder Owner; Folder State and Folder Status. The filter will filter the tree for the respective attributes for all folder levels.

Move (DFM). Using the user interface screen depicted in FIG. 3, the DFM Tree allows the owner of a folder to move the selected folder and child folders to another folder owned by the user which is in the same database and has not been associated to a question in the Request Management Module.

Remove Documents (DFM). The Remove Document option of FIG. 3 allows the user to delete documents from a DFM folder. To be able to remove documents from a folder, the user must be the owner of the selected folder and the documents must not been part of a DFM Folder association. Folder association refers to the document being associated (included in) a particular folder.

Document Search (DS). Referring back to FIG. 2, selecting the Document Search option results in a Document Search Main screen being opened. This screen allows a user to build a boolean search from a list of available attributes. A variety of fields may be used for searching documents depending on the application of the GPDIS. These fields may be modified based on installation requirements. A sort fields screen will display after the user has selected the search criteria. The screen allows the user to determine the order for displaying the results (e.g., documents). In exemplary embodiments, the results are ordered by any combination of the fields.

Results Screen (DS). A results screen displays after the user has selected the sort criteria and executed the query. In an exemplary embodiment, the functionality available from the results screen includes using a right click to access: Reports; Document Detail (Search Criteria Included); Filter Grid; Sort Grid; Associate Document; Composite Documents; Copy to DFM Folder; Document History; Document Image; Document Properties; Full Text; Image Copy; Print Document Image; Print Grid; View Native File; Transfer Tagged Documents Wizard; Copy Native File; Report Coding Error and Select All. In addition, the functionality available from menu buttons includes: Document Image; View Native File; Maximize Grid and Select All.

Saved Queries (DS). A saved queries screen allows users to save document search queries for later use. Once saved, the user has the ability to select an existing query and perform the search again. When launched from the document search (Query Builder) screen on FIG. 2, the open query screen allows the user to select, modify the properties of, or delete an existing query. Once selected, the query builder is populated with the saved query. If the screen is launched from the sort fields or results screen, the save queries screen opens and allows the user to save the current query. A user also has the ability to send a query to another GPDIS user using Lotus Notes.

Request Management Module (RMM). Referring back to FIG. 2, selecting the RMM option results in initiating a request management module in the GPDIS. When GPDIS users receive a request, the GPDIS application provides the ability to enter the requests and group related requests together. Each request contains one or more questions. For each request, the related questions are captured individually, but recorded with respect to the request. Once documents related to a question are located, the GPDIS allows them to be linked to questions that have been created. Once documents have been linked to the question within a request, a response is generated. In an exemplary embodiment, this response is in the form of an electronic export for import to LSA, a mass print sent to a printing center, or image copy to the local machine. These responses are recorded and similar types of responses grouped with respect to the questions.

The RMM provides the ability to create the request group (referred to as a request folder), requests, questions, electronic exports, mass prints, and image copies and record all related attributes. When the module is selected, the user has the ability to open an existing request folder or to create a new request folder. Based on the choice the user selects, the appropriate screen is opened. After the new request folder has been created or an existing request folder has been selected, the module opens with the request folder selected or created. Based on the selected node, attributes of the node are displayed to provide the user with detail about the node and related child records will be displayed in a grid.

Create Request Folder (RMM). The GPDIS users have the ability to create a new request folder when a request is received that is not related to a request folder already created. When the request folder is created, the following information is captured: Creation Date; Request Folder Creator; Request Folder Owner; Request Folder Organization; Request Folder Contact; Case Number; Case Name; Reference Number; Request Folder Name; and Description. The Creation Date is a date that is automatically generated when the request folder is created and cannot be modified. The Request Folder Creator is the GPDIS user who created the request folder, it is automatically captured and can not be modified. The Request Folder Owner is the GPDIS user who is the owner for the request folder. The owner is defaulted to the GPDIS user logged in, but can be changed to any user. The Request Folder Organization is the organization (selected from a list) which all the requests within the request folder originated from. The Request Folder Contact is the name of contact from the requesting organization. This is a name that is selected/entered as part of the contact functionality. The Case Number is the case number that all the requests within the request folder pertain to. The Case Name is the case name that all the requests within the request folder pertain to. The Request Folder Name is the name of the request folder. In an exemplary embodiment, if the request folder organization is legal staff, the name is automatically populated with the contents of Case Number and Case Name. If the organization is not legal staff, then this field is entered by the user. The Description captures the description of the request folder entered by the user. The Request Folder Name must be unique across all request folders created in the system. If the user attempts to create a request folder with a name which already exists, the system will prompt the user with a message that the request folder with that name already exists and must be created with a different name. The Create Request Folder functionality is available to all users with create access in the RMM.

Open Request Folder (RMM). To open an existing request folder in RMM, the GPDIS allows users to search existing request folders based on attributes captured on the request folder level. Those attributes may include: Creation Date; Request Folder Owner; Request Folder Organization; Case Number; Case Name; Request Number; and Request Folder Name. The user selects the attributes to search on. Once a field is selected, the search operator and term(s) will be entered. The data type of the field will determine which operator and format of the search term(s). On entry to RMM, a list of results will be returned and up to 30 (or some other preselected number) can be selected to populate the RMM. When opening a request folder when already in RMM, the user selects only one request folder to load into the tree. If the selected request folder is already loaded into RMM, the user is notified and it will not be added to the tree again. The Open Request Folder functionality is available to all users with view access in the RMM.

Modify Request Folder (RMM). When a request folder node is selected in the RMM display tree, the user can modify attributes with respect to the request folder. Those attributes available for modification are the following: Request Folder Owner; Request Folder Organization; Request Folder Contact; Case Number; Case Name; Reference Number; Request Folder Name; and Description. Note that in exemplary embodiments, the Request Folder Organization can not be modified if the request folder contains requests since attributes on the request level will be captured differently depending on request folder Organization. Modify Request Folder functionality is available to all users with modify access in the RMM. If the user is not the owner, the Modify Request Folder screen will open in read-only mode and modifications cannot be made.

Delete Request Folder (RMM). When a request folder is selected, the user will be able to remove it completely if it contains no requests. If a user attempts to delete a request folder which contains requests, the application will inform them the request folder contains requests and can not be deleted. Delete Request Folder is functionality available to all users with delete access in the RMM. If the user is not the owner, the user will not be able to delete the request folder.

Create Request (RMM). The GPDIS users have the ability to create a new request. The Create Request functionality is available when the request folder the request is to be created in is selected in the RMM tree. When the request is created, the following information (or attributes) may be captured: Creation Date; Request Creator; Request Owner; Requestor Name; Discovery Set Number; Discovery Set Type; Request Name; and Priority.

The Creation Date is the date that is automatically generated when the request is created and cannot be modified. The Request Creator is the GPDIS user who created the request and is automatically captured and cannot be modified. The Request Owner is the GPDIS User who is the owner for the request. The owner is defaulted to the GPDIS user logged in, but can be changed to any user. The Requestor Name is the name of the contact from the requesting organization that sent the request. This is a name that is selected/entered as part of the contact functionality. The Discovery Set Number captures the discovery set number that the questions within the request are part of. The Discovery Type captures the discovery type the questions within the request are part of from a list. The Request Name is the name of the request. In an exemplary embodiment, if the request is created within a legal staff request folder, the name is automatically populated with the contents of Discover Set Number and Discovery Type. If the request folder organization is not the legal staff, this field is entered by the user. The Priority is the priority selected from a list by a GPDIS user when they create the request. The Request Name must be unique across all requests within a request folder. If the user attempts to create a request with a name which already exists in the request folder, the system will prompt the user with a message that a request with that name already exists within the request folder and it must be created with a different name.

Once the request attributes have been entered, the user can choose to enter attributes pertaining to the scope of the request. In an exemplary embodiment, when the GPDIS is being utilized by a company in the automotive industry, the scope is divided into three groups: vehicle; component; and document. In an exemplary embodiment, the attributes available for each are as follows:

Vehicle Scope
Vehicle Type (Car, Truck—Light Duty, Truck—Medium Duty, and Truck-Heavy Duty)
Vehicle Year
Vehicle Make
Vehicle Model
VIN Platform Designation
Transmission Drive (2 Wheel, 4 Wheel, All Wheel, or Front Wheel)
Body Style
Vehicle Program
Component Scope
VPPS Component Code (Level 1)
VPPS Component Code (Level 2)
VPPS Component Code (Level 3) or
UPC (Level 1)
UPC (Level 2)
UPC (Level 3)
UPC (Level 4)
Document Scope
General Document Type
Specific Document Type The Create Request functionality is available to all users with create access in the RMM.

Modify Request (RMM). When a Request node is selected in the RMM display tree, the user can modify attributes with respect to the request. In an exemplary embodiment, the attributes available for modification are the following: Request Owner; Request Contact; Discovery Set Number; Discovery Type; Request Name; and Priority. In an exemplary embodiment, if the request is created within a legal staff request folder and contains questions, when Discovery Type and Discovery Set Number are modified, the system will notify the user questions related to the Discovery Type and/or Discovery Set Number have been created and verify they wish to perform the modification. The user can also modify the attributes pertaining to the scope of the request. In an exemplary embodiment, when the GPDIS is being utilized by the automotive industry, the following attributes can be modified:

Vehicle Scope
Vehicle Type (Car, Truck—Light Duty, and/or Truck—Medium Duty, and Truck-Heavy Duty)
Vehicle Year
Vehicle Make
Vehicle Model
VIN Platform Designation
Transmission Drive (2 Wheel, 4 Wheel, All Wheel, or Front Wheel)
Body Style
Vehicle Program
Component Scope
VPPS Component Code (Level 1)
VPPS Component Code (Level 2)
VPPS Component Code (Level 3) or
UPC (Level 1)
UPC (Level 2)
UPC (Level 3)
UPC (Level 4)
Document Scope
General Document Type
Specific Document Type The modify request functionality is available to all users with modify access in the RMM. If the user is not the owner, the Modify Request screen will open in read-only mode and modifications cannot be made.

Delete Request (RMM). When a request is selected, the user is able to remove it completely if it contains no questions. If a user attempts to delete a request which contains questions, the GPDIS application informs them that the request contains questions and cannot be deleted. Delete Request is functionality available to all users with delete access in the RMM. If the user is not the owner, the user will not be able to delete the request.

Create Question (RMM). The GPDIS users have the ability to create questions when received. The Create Question functionality is available when the request the question is to be created in is selected in the RMM tree. When the question is created, the following information will be captured: Creation Date; Question Creator; Received Date; Question Owner; Question Number(s); Sub-Question Identifier; Question Description; Fulfillment Description; GPDIS Processor; External Processor; Start Date; Creation Date; Completion Date and Due Date.

Creation Date is the date that is automatically generated when the question is created and cannot be modified. The Question Creator is the GPDIS user who created the question, it is automatically captured and can not be modified. The Received Date is the date the question is received. The date is defaulted to the date entered, but can be changed. The Question Owner is the GPDIS user who is the owner for the question. The owner is defaulted to the GPDIS user logged in, but can be changed to any user. The Question Number is the number that identifies the question from the request. The Sub-Question Identifier is the optional sub-question identifier that identifies the question from the request. The Question Description is the description of the question. The GPDIS Processor is the GPDIS user who is the processor of the question. The External Processor is the name of a contact external to the system that is processing the question. This is a name that is selected/entered as part of the contact functionality. The Start Date is the date processing of the question started. The default contains no date but the user can select a date if they wish. The Due Date is the date the response is due back (e.g., to the legal staff if created within a Legal Staff request folder). The Create Question functionality is available to all users with create access in the RMM.

Modify Question (RMM). When a Question node is selected in the RMM display tree, the user can modify attributes with respect to the question. Those attributes available for modification are the following: Received Date; Question Owner; Question Number; Sub-Question Identifier; Question Description; GPDIS Processor; External Processor; Start Date; Due Date; Completion Date; Fulfillment Description; and Additional Material Included.

The Completion Date is the date processing of the question was completed. The Fulfillment Description is the description of how the question was fulfilled. The Additional Material Included indicates if additional material external to the GPDIS was used in the fulfillment of the question. The modify question functionality is available to all users with modify access in the RMM. If the user is not the owner, the Modify Question screen will open in read-only mode and modifications cannot be made.

Delete Question (RMM). When a question is selected, the user will be able to remove it completely if no documents have been associated to it. If a user attempts to delete a question which contains documents, the application will inform them the question contains documents and can not be deleted. Delete Question is functionality available to all users with delete access in the RMM. If the user is not the owner, the user will not be able to delete the question.

Export (RMM). Once documents have been associated to a question, the user will be able to respond to the question by creating an electronic export that can be imported into another system (e.g., by legal staff into the LSA). When the user has selected the question the export is to be performed on, they have the ability to launch the export functionality. In an exemplary, embodiment, this export functionality is only available if the request folder organization the question exists in is a Legal Staff request folder. If the user attempts to create an export for a question that exists in a request folder which is not Legal Staff, the system will prevent the export functionality from being launched and will notify the user. Details specific to the export are captured for history and later review. When the export is created, the following information is captured: Creation Date; Export Creator; Export Name; and Comments. The Creation Date is the date the export was created. The Export Creator is the GPDIS user who created the export and is automatically captured. The Export Name is the name given to export from GPDIS user. The Comments are comments on the specifics of the export. The Export Name must be unique across all exports within a question. If the user attempts to create an export with an Export Name which already exists, the system will prompt the user with a message an export with that name already exists and a new name must be entered. Once the user has entered the export specific information, they will have the ability to select the documents they wish to include in the export. Within a question, a document may only be exported once. If a document has already been included in an export, it will not be available for selection for the export. Once the documents have been selected, the export will be completed.

A status on the export in GPDIS will also be maintained. When the export is created, the status will be queued. When a user (e.g., a LSA user) selects it and begins the import processes, the status will be updated to processing. When the export has successfully been completed, the export will be marked complete. The source document remains in GPDIS with an indication that is it associated (linked) to the request record. Export functionality is available to all users with create access in the RMM.

Delete Export (RMM). Once an export has been created, if processing has not begun, the user who created the export will have the ability to delete it. Once the export has begun processing, it cannot be deleted. This deletion will not be recorded and all documents included will be able to be included in another export within the question. Delete Export is functionality available to the all users with delete access in the RMM. If the user is not the owner, the user will not be able to delete the export.

Re-Export (RMM). Once a document has been included in one export from a question, the document will not be allowed to be included in another export within the selected question. However, the GPDIS user will be able to Re-Export an existing export. This functionality will be launched as a right-click function from a selected export. The application only allows a user to Re-Export an export that has a status of "Complete". This Re-Export will contain the same documents that were included in the original export. For each Re-Export, the following information will be captured: Creation Date; and Export Creator. The Creation Date is the date the Re-Export was performed and the Export Creator is the GPDIS User who ran the re-export. When a Re-Export is created, the status is set to queue. When a user (e.g., a LSA user) selects it and begins the import processes, the status is updated to processing. When the export has successfully been completed, the export is marked complete. Re-Export is functionality available to all users with create access in the RMM.

Print (RMM). The users also have an option to fulfill the question by creating a print that will be printed in a printing center. When users have selected a question documents are to be printed from, they will have the ability to launch the print functionality. This print functionality is available for questions in request folders with any request folder organization. Details specific to the print are captured for history and later review. When the print is created, the following information is captured: Creation Date; Print Creator; Print Name; and Comments. The Creation Date is the date the print was created. The Print Creator is the GPDIS user who created the print and is automatically captured. The Print Name is the name given to print from GPDIS user. The Comments are comments on the specifics of the print. The Print Name must be unique across all prints within a question. If a user attempts to create a print with a Print Name which already exists, the system will prompt the user with a message a print with that name already exists and a new name must be entered.

Once the user has entered the print specific information, they select the order in which the print output is to be ordered. The output is able to be ordered by the following attributes: Document ID; Author; Document Date; and Document Type. Once the order in which the print output is to be produced is determined, the user has the ability to select the documents they wish to include in the print. Within a question, a document can be printed multiple times.

After the user has selected the documents, output specific details will be captured. These specifics capture information that is to be printed on all output pages and is as follows: Document ID Indicator; Page Number Indicator; Title Indicator; and Author Indicator. The Document ID Indicator determines if the unique document identifier should be printed on each page of the document. The Page Number Indicator Determines if the "Page X of Y" should be printed on each page of the document. The Title Indicator determines if the first 50 characters of the captured title should be printed on each page of the document. The Author Indicator determines if the first 50 characters of the captured author(s) should be printed on each page of the document. The user will also have the ability to include document separators by setting another indicator.

After the output specifics have been captured, the recipient of the print is captured. The recipients are selected from the contact list maintained by GPDIS users. For each recipient, the user can provide additional fulfillment details. Those options are as follows: Number of Paper Copies; Number of CD Copies; and Ship Date. The Number of Paper Copies is the number of paper copies sent to the selected recipient. The Number of CD Copies is the number of CD copies sent to the selected recipient. The Ship Date is the date the output must be shipped to the selected recipient. Multiple contacts can be listed as recipients for a given print. Once the recipients are determined, a confirmation of the entered detail will be displayed before the print is completed. Print is functionality available to all users with create access in the RMM.

Re-Print (RMM). When Print is selected in the RMM tree, the user has the ability to print documents as they were originally printed. The re-print prompts the user to enter the recipient(s) of the output. The recipient(s) are selected from the contact list maintained by GPDIS users. For each recipient, the user can provide additional fulfillment details. Those options are as follows: Number of Paper Copies; Number of CD Copies; and Ship Date. The Number of Paper Copies is the number of paper copies sent to the selected recipient. The Number of CD Copies is the number of CD copies sent to the selected recipient. The Ship Date is the date the output must be shipped to the selected recipient. Multiple contacts can be listed as recipients for a given print. Once the recipients are determined, a confirmation of the entered detail will be displayed for confirmation before the re-print is completed.

In addition to the distribution information, the following information will be captured for each Re-Print: Creation Date and Print Creator. The Creation Date is the date the Re-Export was performed. The Print Creator is the GPDIS user who ran the re-print. Print is functionality available to all users with create access in the RMM.

Image Copy (RMM). Once documents have been associated to a question, the user is able to fulfill the question by creating an electronic copy of the images for a selected document(s). When the user has selected a question that the image copy is to be performed on, they have the ability to launch the copy functionality. This image copy functionality is available for questions in request folders with any request folder organization.

Details specific to the image copy are captured for history and later review. When the image copy is created, the following information is captured: Creation Date; Image Copy Creator; Image Copy Name; and Comments. The Creation Date is the date the image copy was created. The Image Copy Creator is the GPDIS user who created the image copy, it is automatically captured. The Image Copy Name is the name given to image copy from GPDIS user. The Comments are comments on the specifics of the image copy. The Image Copy Name must be unique across all image copies within a question. If the user attempts to create an image copy with an Image Copy Name which already exists, the system will prompt the user with a message an image copy with that name already exists and a new name must be entered.

Once the information has been captured, the user has the ability to select the documents they wish to include in the copy. Within a question, the images of a document can be copied multiple times. Once the documents have been selected, the system calculates the number of pages to be copied. If the total number of pages exceeds a threshold set by the administrator, the GPDIS prevents the user from performing the image copy for performance reasons.

After the user has selected the documents, output specific details are captured. These specifics capture information that is to be on all output pages and include: Document ID Indicator; Page Number Indicator; Title Indicator; and Author Indicator. The Document ID Indicator determines if the unique document identifier should be printed on each page of the document. The Page Number Indicator determines if the "Page X of Y" should be printed on each page of the document. The Title Indicator determines if the first 50 characters of the captured title should be printed on each page of the document. The Author Indicator determines if the first 50 characters of the captured author(s) should be printed on each page of the document. After the output specifics have been captured, the location the images are to be copied to is selected. This selection will allow the user to select destination on their local drive the images will be copied to. Once the destination has been selected, the copy will be performed. The files are named using a convention which will allow documents to be grouped together with their pages being numerical order. In an exemplary embodiment, to provide this, the files will be named 'DOCUMENT_ID'_'PAGE_NO'. An example would be the following:

000000001_0001.tif
   000000001_0002.tif
   000000001_0003.tif
   000000002_0001.tif
   000000002_0002.tif When copying images, a status bar shows the completeness of the copy. The user has the ability to cancel the copy and no history of the copy will be recorded. If the copy of images is not completely successful, the image copy fail is not recorded. Image Copy is functionality available to all users with create access in the RMM.

Re-Copy (RMM). When an Image Copy is selected in the RMM tree, the user is able to copy the images again as they were originally copied. The Re-Copy function will prompt the user for the location the images are to be copied to. Once the destination has been selected, the copy is performed. In addition to the location the files are going to be copied to, the following information is captured: Creation Date; and Image Copy Creator. The Creation Date is the date the Re-Export was performed. The Image Copy Creator is the GPDIS user who ran the image copy. The files are named using a convention which will allow documents to be grouped together with their pages being numerical order. To provide this, in an exemplary embodiment, the files are named 'DOCUMENT_ID'_'PAGE_NO'. An example would be the following:

000000001_0001.tif
   000000001_0002.tif
   000000001_0003.tif
   000000002_0001.tif
   000000002_0002.tif When copying images, a status bar shows the completeness of the copy. The user has the ability to cancel the copy and no history of the re-copy will be recorded. If the re-copy of images is not completely successful, the image copy fail is not recorded. Re-Copy is functionality available to all users with create access in the RMM.

Delete Document(s) (RMM). When a question is selected, the user is able to remove documents if they have not been included in a response (e.g. Export, Print, or Image Save) or associated as part of a Question association. If the documents were associated as part of a DFM folder association, the folder state recalculated and set to the appropriate state. If a user attempts to delete a document which can not be deleted, the application informs them that the document(s) cannot be deleted. Delete Document is functionality available to all users with delete access in the RMM. If the user is not the owner of the question, the user is not able to delete the documents.

Response History (RMM). When a response is re-processed, a history of the re-processing is maintained. This history includes the following information: Creation Date; and Response Creator. The Creation Date is the date the response was re-processed. The Response Creator is the GPDIS user who re-processed the response. This information, along with the following information will be available for display for all re-processed responses: Response Tracking Number; Response Type; Response Name; Number of Documents; and Number of Pages. The Response Tracking Number is a unique number assigned to each response. The Response Type is the type of response. The Response Name is a name given to each response when created. The Number of Documents is the number of documents included in the re-processed response. The Number of Pages is the number of pages included in the re-processed response. In addition to the above mentioned details, prints contain additional distribution information for each Re-Print processed. This additional distribution is also available for display. This Re-Process History is available from the details frame if the respective response has been re-processed. Response History is functionality that is available to all users with view in the RMM.

Request Search Module (RSM). Referring back to FIG. 2, selecting the Request Search option results in initiating a request search module in the GPDIS. This allows a user to search for requests which are already in the system. This search function allows the user to perform a search on request attributes and to return the request(s) which match the search criteria. Exemplary attributes that are available to search on in an automotive application are the following: Request Tracking Number; Discovery Set Number; Discovery Set Type; Request Name; General Document Type; Specific Document Type; Vehicle Type; Vehicle Year; Vehicle Make; Vehicle Model; VIN Platform; Transmission Drive; Body Style; Question Description, VPPS Component Code (Level 1); VPPS Component Code (Level 2); VPPS Component Code (Level 3); UPC (Level 1); UPC (Level 2); UPC (Level 3); and UPC (Level 4).

The results populate a Request grid. As used herein the term request grid refers to the list, in table form, of requests that satisfy the specified request attributes. From this grid, the following functions are available: Filter Grid; Sort Grid; and View Request Details. The View Request Details displays the scope attributes because the Modify Request screen is launched in read only mode. With the requests populated in the grid, the user can then select a request. When the user selects a request, all questions for that request are displayed in a question grid. As used herein the term question grid refers to the list, in table form, of individual questions with a specific request (e.g., a discovery request) to which individual documents are associated. From this grid, the following functions will be available: Set Filter; Apply Filter; and Clear Filter. With the questions populated in the question grid, the user can select an individual question. When the question is selected, the question description will be displayed below the question grid. A document grid will also display showing all the documents that have been associated to the question. From this grid, the following functions are available: Reports (Document Detail, Individual Document); Filter Grid; Sort Grid; Associate Document; Composite Documents; Copy to DFM Folder; Document History; Document Image; Document Properties; Full Text; Image Copy; View Native File; Transfer Tagged Documents Wizard; Copy Native File; Report Coding Error; Print Document Image; Print Grid; and Select All. If the user wishes to perform a different query, they can select the "Search" button from the form.

Engineer Review Comments (Common). Documents exported from the GPDIS are frequently reused in multiple cases within LSA. For each case the document(s) is relevant to, it will be sent to an engineer for review. Functionality is provided to allow engineers to maintain comments on the document level across cases.

Association (Common). Once users have located documents responsive to a question, they are able to associate (link) these documents to the question for fulfillment purposes. This association process allows users to select a DFM folder, RMM question, or individual document(s) and associate them to a question. When associating a DFM folder, the user is able to determine if they wish to include documents within the selected folder's subfolder or only the documents within the selected folder. The user then locates the question to associate the documents to. To locate the appropriate question, they first locate the request folder which holds the request the question is part of. The user will be able to identify the request folder by the following attributes: Request Folder Organization; Case Number; Case Name; Reference Number; and Request Folder Name.

Once the request folder has been identified, the request folder structure is displayed and the user is able to select a question, create a new question, or create a new request and question. When the respective nodes are selected, the attributes of that node are displayed to aid the user in locating the proper question. For each node, the following information will be displayed when selected. Request Folder: Request Folder Owner; Request Folder Organization; Request Folder Contact; Case Number; Case Name; Reference Number; Request Folder Name; and Description. Request: Request Owner; Request Contact; Discovery Set Number; Discovery Set Type; Request Name; and Priority. Question: Received Date; Question Owner; Question Number; Sub-Question Identifier; Question Description; GPDIS Processor; External Processor; Start Date; and Legal Staff Due Date (or due date). Once the question has been selected, the association will be sent to deferred processing and the documents, source folder, and target question will be locked for processing.

Image Copy (Common). To allow users to copy the images from selected documents to the local drive, an Image Copy function is available as a document grid and image viewer function. When run from the document grid, the save allows multiple documents to be selected and images copied. When run from the image viewer, only the images of the current document will be copied locally. Once the documents have been selected, the system will calculate the number of pages to be copied. If multiple documents have been selected and exceed a threshold set by the administrator, the application will prevent the user from performing the image copy for performance reasons. If a single document is selected and exceeds the threshold, the application will warn the user the number of pages exceeds the threshold, but will allow the user to continue.

As part of the process, the user determines if they want additional attributes included on the images by setting indicators. In exemplary embodiments, the indictors and the attributes they will include on each image are the following: Document ID Indicator; Page Number Indicator; Title Indicator; and Author Indicator. The Document ID Indicator determines if the unique document identifier should be printed on each page of the document. The Page Number Indicator determines if the "Page X of Y" should be printed on each page of the document. The Title Indicator determines if the first 50 characters of the captured title should be printed on each page of the document. The Author Indicator determines if the first 50 characters of the captured author(s) should be printed on each page of the document. After the output specifics have been captured, the location that the images are to be copied to is selected. This selection allows the user to select a destination on their local drive that the images will be copied to. Once the destination has been selected, the copy is performed. The files are named using a convention which allows documents to be grouped together with their pages being numerical order. To provide this, the files are named 'DOCUMENT_ID'_'PAGE_NO'. An example is the following:

000000001_0001.tif
000000001_0002.tif
000000001_0003.tif
000000002_0001.tif
000000002_0002.tif When copying, the progress is displayed and an opportunity to cancel is available if the user determines the copy is running too long.

Contact Management (Common). When representing entities in the GPDIS, users need to have the ability to link these entities to contacts that are not users in the application. For example, if a request folder has a request folder organization of Legal Staff, the contact name will be a Legal Staff coordinator. These contacts are maintained in a controlled manner and more information that just name is captured. To allow this, a contact list is maintained. This management is done through a Contact Management function from the Options menu. The GPDIS users have the ability to add, modify, or view all contacts. In an exemplary embodiment, the information captured for each contact is as follows: Last Name; First Name; Middle Initial; Address One; Address Two; City; State; Postal Code; Country; Email; Organization (Legal Staff, Product Development, or Other); and Phone. When linking an entity to a contact, the available contacts are displayed and selected from the contact management screen. If the contact does not exist, the user has the ability to launch the Contact Management functionality from the screen they are on.

Document Properties (Common). The Document Properties open for a selected document record. The screen displays a set of coded document attributes. An additional Coded Data tab displays all coded document attributes. In an exemplary embodiment, the properties tab displays the following information for the selected document: Document ID; Accession Range; Attachment Range; Author; Document Type; Document Source; Business Location; Document Date; Title (Description); and Document Load Date. In an exemplary embodiment all coded document fields are displayed in the coded data tab of the Document Properties screen.

Print Document Image (Common). The Print Document Image prints the images for the selected document(s) to the local printer. The print can be preformed by selecting a document(s) from the grid or from the image viewer. Once the documents have been selected, the system calculates the number of pages to be copied. If multiple documents have been selected and exceed a threshold set by the administrator, the application will prevent the user from performing the print for performance reasons. If a single document is selected and exceeds the threshold, the application will warn the user the number of pages exceeds the threshold, but will allow the user to continue. The application will then prompt the user to print the documents with the following attributes: Document ID Indicator; Page Number Indicator; Title Indicator; and Author Indicator. The Document ID Indicator determines if the unique document identifier should be printed on each page of the document. The Page Number Indicator determines if the "Page X of Y" should be printed on each page of the document. The Title Indicator determines if the first 50 characters of the captured title should be printed on each page of the document. The Author Indicator determines if the first 50 characters of the captured author(s) should be printed on each page of the document. Once the output specific information has been selected, the user will select the printer the output is to be sent to. Once the printer is selected, the output will be sent to the printer.

Document History (Common). The Document History screen displays all responses a document has been included in. The following information is displayed for each response: Response Tracking Number; Response Name; Response Type (Export, Image Copy, or Print); Response Creator; Response Creation Date; Request Folder Tracking Number; Request Folder Name; Request Tracking Number; Request Name; Question Tracking Number; Question Number; and Question Sub-Identifier. From the Document History grid, the user will be able to perform the following functions: Set Filter; Apply Filter; and Clear Filter.

Image Viewer (Common). The Image Viewer opens a selected document or set of documents for viewing. The viewer has the following functionality. File: Document Properties; Image Copy; Report Bad Image; Print; and Exit. View: Thumbnail View; Next Document; Previous Document; and Physical View. Page: Previous; Next; First; Last; Rotate (Right, Left, Invert); and Drag. Zoom: Zoom In; Zoom Out; Best Fit; Fit to Height; Fit to Width; 25%; 50%; 75%; 100%; and 200%. Help: GPDIS Help; and About GPDIS. View Native File.

Filter Grid (Common). The user is able to filter the results of enhanced grids. The user selects from a list of filterable fields and constructs a boolean search that is applied to the contents of the grid. The filter can be modified by performing the Filter Grid function again. The user also has the ability to refresh the grid, returning the grid to the previous contents.

Sort Grid (Common). The user sorts the results of enhanced grids. The user selects from a list of sortable fields and determines the order contents will be sorted in. The sort can be modified by performing the Sort Grid function again. The user also has the ability to refresh the grid, returning the grid to the previous contents.

Composite Document (Common). The Composite Document functionality opens the composite documents for a single selected composite document. If the document does not have any composites, or the user has selected multiple documents, the application notifies the user. When a document is selected which has composite documents, the Composite Document screen displays the following document attributes: Document ID; Accession Range; Attachment Range; Author; Document Type; Document Source; Business Location; and Document Date. From the document grid, the following functionality is available: Reports (Document Detail); Filter Grid; Sort Grid; Associate Document; Copy to DFM; Document History; Document Image; Document Properties; Full Text; Image Copy; Print Document Image; Print Grid; and Select All.

Copy to DFM (Common). The Copy to DFM functionality allows a user to select a document or set of documents from a grid and copy those documents to a DFM Folder. If any of the selected documents are a piece of a composite document, the components will appear and can be selected to be included. Once the documents are identified, the DFM Folder the documents are to be copied to must be determined. The DFM Tree is displayed and the user is allowed to navigate through to find the desired folder. When selected, the following folder attributes will be displayed for the folder: Folder Name; Folder Type; Folder Owner; Database; Folder Comments; Folder Status; and Folder State. The user also has the ability to filter the DFM Tree or create a new DFM folder (users with create access in DFM) when in the folder selection screen. Once selected, the documents will be copied into the identified DFM folder. Copy to DFM is functionality available to all users with create in the DFM.

Full Text (Common). The Full Text view opens the full text for a selected document. If the selected document does not contain full text, the application will notify the user. The viewer displays the full text of a document for each page. The viewer provides the following functionality: Print; Find; Copy; Go To; Next; Previous; First; and Last. Print allows the user to print the text from the selected page or all pages within the document. Find allows the user to search the entire document for identified text. Copy places the selected contents onto the clipboard. Go To navigates to the entered page. Next navigates to the next page. Previous navigates to the previous page. First navigates to the first page. Last navigates to the last page.

Print Grid (Common). The Print Grid functionality allows the user to print the contents of the grid to the local printer.

Select All (Common). The Select All functionality allows the user to select all records from the grid.

Data Requirements. Database tables utilized to define data requirements to support the GPDIS application.

Reports. A variety of reports may be generated in exemplary embodiments depending upon the environment in which the GPDIS is employed.

Use Cases. A variety of use cases may be employed in exemplary embodiments.

The database layouts, user interface screens, data elements, processing flow and reports described herein are intended to be exemplary in nature. Variations in database layouts, user interface screens, data elements, processing flow and reports may be implemented by exemplary embodiments without departing from the scope of the instant invention. In addition other document types (e.g., engineering, marketing) may also be managed by exemplary embodiments of the present invention. Further, the documents may be exported for use in any system (e.g., product engineering, marketing, etc.) and export is not limited to documents for importation into the LSA system. The LSA system described herein is an example of the kind of system that may require the collection and importing of documents.

Figure 4:
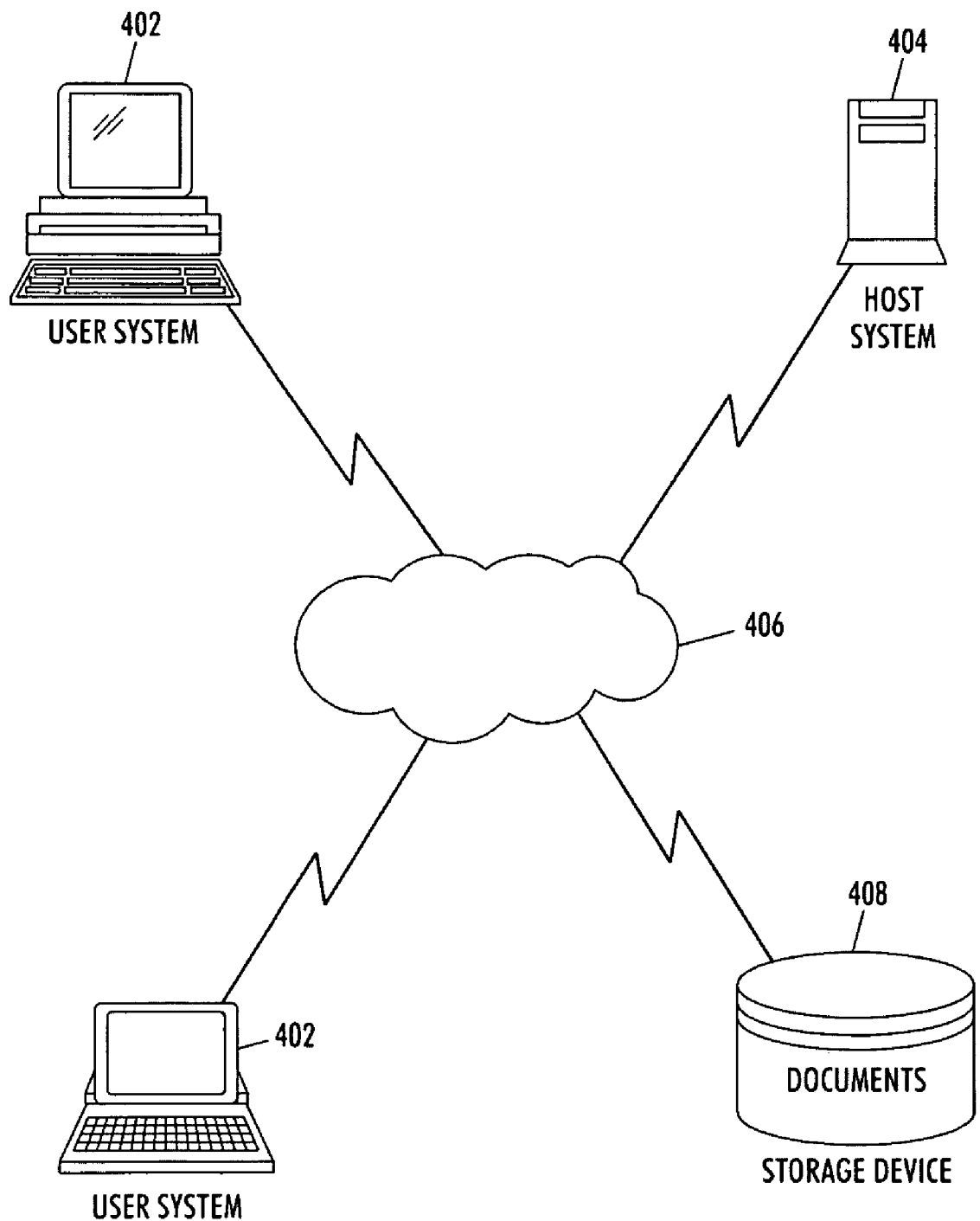
FIG. 4 is a block diagram of an exemplary system that may be implemented by exemplary embodiments for electronically managing product related data.

Referring to FIG. 4, a block diagram of an exemplary system for electronically managing product related data for use in legal discovery is generally shown. The system includes a GPDIS application that is executed by one more computer programs located on a host system 404. The GPDIS manages product related information and provides computer processes to perform activities in support of legal matters.

Referring to FIG. 4, the host system 404 executes computer instructions for performing GPDIS functions. The system depicted in FIG. 4 includes one or more user systems 402 through which users at one or more geographic locations may contact the host system 404. The user systems 402 are coupled to the host system 404 via a network 406. Each user system 402 may be implemented using a general-purpose computer executing a computer program for carrying out the processes described herein. The user systems 402 may be personal computers (e.g., a lap top, a personal digital assistant) or host attached terminals. If the user systems 402 are personal computers, the processing described herein may be shared by a user system 402 and the host system 404 (e.g., by providing an applet to the user system 402).

In exemplary embodiments the host system 404 also includes the LSA (or other system for importing GPDIS documents) and the storage device 408 includes the data required by the LSA. In other embodiments, the LSA and the GPDIS are located on different processors and/or the LSA data and the GPDIS data are located on different storage devices. If the LSA and GPDIS area located on different processors then the different processors must be capable of communicating with each other (e.g., via a network) to perform the processing described herein such as the import and export functions.

In exemplary embodiments the host system 404 also includes one or more of the feeder systems containing product related documents and the storage device 408 includes the data required by the feeder systems. In other embodiments, the feeder systems and the GPDIS are located on different processors and/or the feeder data and the GPDIS data are located on different storage devices. If the feeder systems and GPDIS area located on different processors, then the different processors must be capable of communicating with each other (e.g., via a network) to perform the processing described herein such as the GPDIS collecting of related documents from feeder systems.

The network 406 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. A user system 402 may be coupled to the host system through multiple networks (e.g., intranet and Internet) so that not all user systems 402 are coupled to the host system 404 through the same network. One or more of the user systems 402 and the host system 404 may be connected to the network 406 in a wireless fashion. In one embodiment, the network is an intranet and one or more user systems 402 execute a user interface application (e.g. a web browser) to contact the host system 404 through the network 406. In another exemplary embodiment, the user system 402 is connected directly (i.e., not through the network 406) to the host system 404 and the host system 404 is connected directly to or contains the storage device 408.

The storage device 408 includes a data repository with product development related data as described herein and with data for managing the product related data/documents. The storage device 408 may be implemented using a variety of devices for storing electronic information. It is understood that the storage device 408 may be implemented using memory contained in the host system 404 or that it may be a separate physical device. The storage device 408 is logically addressable as a consolidated data source across a distributed environment that includes a network 406. Information stored in the storage device 408 may be retrieved and manipulated via the host system 404 and/or via the user system 402. The data repository includes one or more databases (e.g., GPDIS databases) containing documents that are product, or product development, related. The documents in the databases are typically scanned documents that are stored as images. These documents may be classified as composite documents and/or individual components of a composite document. A composite document includes two or more individual documents that may be considered separately or as a single unit. In addition, the data repository (e.g., GPDIS databases) includes attributes associated with the documents (e.g., the folder attributes).

Individual documents that comprise a composite document are coded upon entry into the data repository (e.g., by a centralized group of document entry coordinators). The coding includes assigning a document type, an accession range, and an attachment range to each document. Each of the components (also referred to herein as 'individual documents') that constitute a composite document are assigned a unique accession range and will share a common attachment range. The accession range is the page numbers associated with the individual document within the composite document (e.g., 005-008). The attachment range is the number of pages associated with the entire composite document (e.g., 001-020). The document type describes the source document and may include a value such as drawing, photograph, test result, report, memo, letter, data, transcription, manual, computer file, record, etc. By using the document type, accession range and attachment range in this manner, the computer programs are able to perform various functions on the composite document and/or its individual components.

In exemplary embodiments of the present invention, the host system 404 operates as a database server and coordinates access to application data including data stored on the storage device 408. The host system 404 depicted in FIG. 4 may be implemented using one or more servers operating in response to a computer program stored in a storage medium accessible by the server. The host system 404 may operate as a network server (e.g., a web server) to communicate with the user system 402. The host system 404 handles sending and receiving information to and from the user system 402 and can perform associated tasks. The host system 404 may also include a firewall to prevent unauthorized access to the host system 404 and enforce any limitations on authorized access. For instance, an administrator may have access to the entire system and have authority to modify portions of the system. A firewall may be implemented using conventional hardware and/or software as is known in the art.

The host system 404 may also operate as an application server. The host system 404 executes one or more computer programs to provide the GPDIS functions described herein. Processing may be shared by the user system 402 and the host system 404 by providing an application (e.g., java applet) to the user system 402. Alternatively, the user system 402 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

Exemplary embodiments include having the GPDIS being executed on an instance that is separate from the litigation support application (LSA) instance.

The LSA system performs several functions including electronically managing discovery pleading information, electronically managing privileged and non-privileged documents, electronically managing composite documents, and electronically managing remote review of documents.

The LSA function of electronically managing discovery pleading information allows a user having an instant discovery request to search a repository to access prior discovery requests and corresponding responses to aid in formulating a response to the instant discovery request. The corresponding prior discovery responses include the documentary and other information previously produced in response to the prior discovery request, and may also include the text of the response itself. Thus, efficiency and consistency in responding to discovery requests is promoted. The electronic management of discovery pleading information by the LSA is described in more detail in U.S. Pat. No. 7,058,661 to Ciaramitaro, et al., of common assignment herewith and incorporated herein by reference in its entirety.

The LSA function of electronically managing privileged and non-privileged documents provides two independent schemas for privileged and non-privileged documents. One schema is a privileged schema for storing privileged documents and the other schema is a non-privileged schema for storing non-privileged documents. The two schemas are separate and distinct so that privileged and non-privileged documents are not commingled. Access to the privileged schema is restricted to privileged users while non-privileged users have access only to the non-privileged schema. As a result, privileged documents are protected against the inadvertent waiver of privilege. The electronic management of privileged and non-privileged documents by the LSA is described in more detail in U.S. Pat. No. 7,130,858 to Ciaramitaro, et al., of common assignment herewith and incorporated herein by reference in its entirety.

The LSA function of electronically managing composite documents provides a repository of electronically stored individual documents, where a subset of the individual documents are associated with other individual documents to form composite documents. A search tool is also provided for locating a selected individual document, where the selected individual document is associated with a selected composite document. A selection tool for selecting a function to be applied to the selected individual document includes an option to apply the function to other individual documents within the selected composite document. This allows the selected individual document to be operated on individually or with the other individual documents within the selected composite document. The electronic management of composite documents by the LSA is described in more detail in U.S. Pat. No. 7,065,515 to Ciaramitaro, et al., of common assignment herewith and incorporated herein by reference in its entirety.

The LSA function of electronically managing remote review of documents provides a remote review system that advantageously enables a remote reviewer, lacking repository access to remotely review and record decisions in respect to documents stored in the repository and then electronically integrate those remotely made decisions back into the repository. In this way, efficiency and consistency in responding to document requests for legal purposes is promoted. The electronic management of remote review of documents by the LSA is described in more detail in U.S. Publication No. 2005/0004950 to Ciaramitaro, et al., of common assignment herewith and incorporated herein by reference in its entirety.

LSA Functionality. The following section includes a more detailed description of how the system must behave to import documents from the GPDIS, focusing on functionality that will be used in LSA.

Import Response Documents (LSA). Once an export response has been created by a GPDIS user, a LSA user will have the ability to import those documents into LSA. The target of the import will be a DFM folder. When a single DFM folder is selected in the DFM tree, the import function will be available. Once the import function has been launched, the user must identify the export to import. This will be done by first identifying the request folder which holds the export. The user will locate the request folder by searching on the following fields: Request Folder Tracking Number; Case Number; Case Name; Request Folder Name; and LS Contact. The Request Folder Tracking Number is a unique number assigned to all request folders. The Case Number is the case number of the request folder which the GPDIS user has created the export in. The Case Name is the case name of request folder which the GPDIS user has created the export in. The Request Folder Name is the name given to the request folder by the GPDIS user. The LS Contact is the legal contact that has been assigned to the request folder which the GPDIS user has created the export in.

The search will return Legal Staff request folders which meet the search results. Once the request folder has been identified, a tree view of the request folder structure will be visible to the LSA user to select the export. The structure contains the request folder, requests, questions, and exports that have been created (Prints and Image Saves will not be visible). As the user selects each node in the tree, attributes specific to that node will be displayed. Those details displayed with each node will be the following. Request Folder: Request Folder Tracking Number; Creation Date; Case Number; Case Name; Request Folder Name; Legal Staff Contact; and Description. Request: Request Tracking Number; Creation Date; Discovery Set Number; Discovery Set Type; and Request Name. Question: Question Tracking Number; Creation Date; Question Number; Sub-Question Identifier; Question Description; and Fulfillment Description. Export: Export Tracking Number; Creation Date; Export Name; Documents Exported; Pages Exported; and Comments. Only exports that have an export status of "queued" or will be displayed in the tree. Once the user has selected the export they wish to import, the documents within the export are displayed for review. The user is not able to view the document images, but will be able to view them in a grid with coded attributes populated. Once the user has reviewed the documents included in the export, the documents which have already been imported are displayed. These documents will not be imported again, but will be foldered in the selected folder.

After the user has reviewed the documents and documents which have already been imported, the user will select import details. If the target of the import is a User Folder, details the user will select are as follows: Case Number; Case Name; Discovery Coordinator; Discovery Set (# Type); Question Number; and Folder Structure Indicator. The Case Number refers to the case number that the documents are import for. This is populated using a Find Case button which opens the Case Identification screen. The Case Name is the case names that the documents are being imported for. This is populated with the Case Name of the selected Case Number. The Discovery Coordinator is the discovery coordinator of the case the documents are being imported for. This will be defaulted to the user, but can be modified to be any user from the system. The format of the data being populated will be LAST-FIRST. The Discovery Set is the discovery set number and discovery set type for which the documents are being loaded into the system. Multiple discovery sets may be selected. The Question Number is the question number for which the documents are being loaded into the system. Multiple questions may be entered with a maximum of 999 (or some other pre-selected maximum). The Folder Structure Indicator determines if the LSA User wishes to import the folder structure from GPDIS DFM.

If the target is a Standing Collection, only Folder Structure Indicator can be selected. Once the import details have been selected, the information will be validated. The validation will prevent the user from importing a folder structure to a target folder which is deeper than level 3 (assuming 0-5 are valid levels). Once the validation is complete, the import will be sent to deferred processing. When the request for import is created, the export status in GPDIS is updated to "processing". The import will first copy the images for all documents that have not been imported into the selected database onto the LSA image server. Once the images are copied, the documents that have not been imported into the selected database will be inserted. Once the documents have been imported, all documents will be foldered into the selected folder. If the user chose to import the GPDIS folder structure, the documents will be foldered using the DFM folder and structured they were associated to the question as. If the documents were not part of a DFM Folder association, the documents will be foldered into the selected folder. When processing has completed successfully, the status will be updated to Complete.

As described above, the embodiments of the invention may be embodied in the form of hardware, software, firmware, or any processes and/or apparatuses for practicing the embodiments. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A computer program product for electronically responding to requests for product related data, the computer program product comprising a non-transitory storage medium readable by a processing circuit and storing instructions for execution by the processing circuit for facilitating a method comprising:
   collecting product related data from feeder systems;
   organizing the collected product related data into digital libraries within a document management system;
   receiving a discovery request from legal counsel to identify related documents;
   searching the product related data for documents;
   tagging documents identified in the search and placing copies of the documents in a holding queue; and
   exporting the documents in the holding queue to a litigation support system;
   wherein when the discovery request is received, a request management module groups requests together hierarchically in response to request group, individual request details, and question;
   wherein documents are linked to a question to create a relationship between the question and documents;
   wherein documents contained in the export are maintained and grouped with all exports for that question.

2. The computer program product of 1, wherein a first level denotes the request group, a second level denotes request details and a third level denotes actual questions to be answered for each request.

3. The computer program product of claim 1, further comprising foldering documents into at least one of a source folder, collection folder, and user folder.

4. The computer program product of claim 3, wherein documents are foldered into the collection folder using a categorization method defined by the document management system.

5. The computer program product of claim 3, wherein documents are foldered into the user folder using a categorization method defined by a user base of a particular installation of the document management system.

6. A method for electronically responding to requests for product related data, the method comprising:
   collecting product related data from feeder systems;
   organizing the collected product related data into digital libraries within a document management system;
   receiving a discovery request from legal counsel to identify related documents;
   searching, by a computer, the product related data for documents;
   tagging documents identified in the search and placing copies of the documents in a holding queue; and
   exporting the documents in the holding queue to a litigation support system;
   wherein when the discovery request is received, a request management module groups requests together hierarchically in response to request group, individual request details, and question;
   wherein documents are linked to a question to create a relationship between the question and documents;
   wherein documents contained in the export are maintained and grouped with all exports for that question.

7. The method of claim 6, wherein collecting product related data from feeder systems includes collecting product related data in either paper or electronic format.

8. The method of claim 6, further comprising foldering documents into at least one of a source folder, collection folder, and user folder.

9. The method of claim 8, wherein documents are foldered into the user folder using a categorization method defined by a user base of a particular installation of the document management system.

10. The method of claim 8, wherein documents are foldered into the source folder upon loading documents into the document management system.

11. The method of claim 8, wherein documents are foldered into the collection folder using a categorization method defined by the document management system.

12. The method of claim 6,
wherein a first level denotes the request group, a second level denotes request details and a third level denotes a question to be answered for each request.

13. The method of claim 12, wherein exporting documents in the holding queue to a litigation support system includes generating a record of the exporting.

14. The method of claim 13, further comprising generating a report of documents associated to specific questions.

15. A system for electronically responding to requests for product related data, the system comprising:
   a data storage device storing product related data;
   a host system executing a program to implement a product development information system;
   a user system;
   a network establishing communications between the data storage device, the user system and the host system;
   the host system performing:
      collecting product related data from feeder systems;
      organizing the collected product related data into digital libraries within the data storage device;
      receiving a discovery request from a user system to identify related documents;
      searching the product related data in the data storage device for documents;
      tagging documents identified in the search and placing copies of the documents in a holding queue; and
      exporting the documents in the holding queue to the user system;
   wherein when the discovery request is received, a request management module groups requests together hierarchically in response to request group, individual request details, and question;
   wherein documents are linked to a question to create a relationship between the question and documents;
   wherein documents contained in the export are maintained and grouped with all exports for that question.

16. The system of claim 15, wherein collecting product related data from feeder systems includes collecting product related data electronic format.

17. The system of claim 15, further comprising the host system foldering documents into at least one of a source folder, collection folder, and user folder.

18. The method of claim 17, wherein documents are foldered into the source folder upon loading documents into the document management system.

19. The system of claim 17, wherein documents are foldered into the collection folder using a categorization method defined by the document management system.

20. The system of claim 17, wherein documents are foldered into the user folder using a categorization method defined by a user base of a particular installation of the document management system.

21. The system of claim 15, wherein a first level denotes the request group, a second level denotes request details and a third level denotes a question to be answered for each request.

22. The system of claim 21, wherein exporting documents in the holding queue to a litigation support system includes generating a record of the exporting;
   wherein documents contained in the export are maintained and grouped with all exports for that question.

23. The system of claim 22, further comprising generating a report of documents associated to specific questions.

* * * * *